United States Patent [19]
Powell

[11] Patent Number: 4,486,653
[45] Date of Patent: Dec. 4, 1984

[54] ADAPTIVE RATE CARD DATA REPRODUCING AND STORING APPARATUS

[75] Inventor: Kenneth E. Powell, Boca Raton, Fla.

[73] Assignee: International Business Machines, Armonk, N.Y.

[21] Appl. No.: 315,761

[22] Filed: Oct. 28, 1981

[51] Int. Cl.³ .............................................. G06K 7/08
[52] U.S. Cl. .................... 235/449; 235/472; 235/474; 235/482
[58] Field of Search ............... 235/449, 474, 472, 482; 360/2

[56] References Cited

U.S. PATENT DOCUMENTS

| | | |
|---|---|---|
| 3,597,751 | 8/1971 | Heidecker et al. ........................ 360/2 |
| 3,749,889 | 7/1973 | Vaskunas ............................... 235/474 |
| 3,751,639 | 8/1973 | Searle ................................... 235/474 |
| 3,864,548 | 2/1975 | Oneil .................................... 235/466 |
| 3,902,129 | 8/1975 | Boothroyd .............................. 329/107 |
| 3,946,206 | 3/1976 | Darjany ................................. 235/449 |
| 3,947,662 | 3/1976 | Vinal .................................... 235/402 |
| 4,096,378 | 6/1978 | Vinal .................................... 235/466 |
| 4,143,355 | 3/1979 | MacIntyre .............................. 235/449 |
| 4,184,179 | 1/1980 | Deming .................................. 360/44 |
| 4,345,278 | 8/1982 | Double .................................. 235/474 |

Primary Examiner—Harold I. Pitts
Attorney, Agent, or Firm—Otto Schmid, Jr.

[57] ABSTRACT

The invention is directed to circuitry for reproducing the data on a magnetic stripe recorded. A security access card is manually passed through a card-reading device at an uneven low velocity, storing the data in one half cycle of operation in uniform number of data storage cells despite the unevenness of speed, and reading out the data at a predetermined rate, during the other half cycle of operation for delivery to a data processing unit.

8 Claims, 12 Drawing Figures

| 6A | 6B | 6C | 6D | 6E | 6F |

Key To FIG.6

FIG.6F

ADAPTIVE RATE CARD DATA REPRODUCING AND STORING APPARATUS

FIELD

The invention relates to apparatus for reproducing recorded data on cards and the like, and it particularly pertains to such apparatus for reproducing as slow and varying velocities of the order of those encountered in hand scanning and/or manual pass-through of data recorded in magnetic recorded media.

BACKGROUND

There is an area of endeavor devoted to the use of electomagnetic, and also photoelectric, transducers at relatively slow scanning velocities and at varying rates. The most common situation is found in hand scanning, as in supermarket applications, and manual pass-through, as in personnel access and tracing systems.

One well-known application of the apparatus according to the invention resides in the field of conventional magnetic stripe card records, the record of which is translated by a conventional magnetic transducer. The basic card presently utilized in Card Accessing (CA) systems is the American Banking Association standard, single track, magnetically encoded card. The data encoded in the magnetic stripe area of the card is recorded at a density of 29.5 bits per centimeter (75 bits per inch) in a F2F manner. In use, the magnetic recording surface passing electromagnetic transducer develops a signal. In applications such as CA systems, the terminal is a manually operated device in which the card is drawn across the transducer manually by the user. Due to this, the velocity of the magnetic surface as it passes the transducer varies greatly. This variation in card velocity results in a highly variable data rate at the output with the transducer.

In practical applications, the velocity of 4 to 12 inches per second are encountered in manual card read operations. These variations are encountered in a single read cycle and result in sizable change(s) in the data rate variable at the read head. This variable rate is difficult for a CPU to handle and results in a high read-retry or error rate and incompatibility with standard modems and like telecommunications devices.

Serious problems have been met in this area. Solutions have been suggested that in most cases are based on the phenomena present and data taken on the relatively higher speed recording and reproducing systems, although not all of the effort has neglected the lower speed aspects of the various arrangements. Most, if not all, of the prior arrangements have been both complex and expensive.

SUMMARY

The objects of the invention indirectly referred to hereinbefore and those that appear as the specification progresses are attained in adaptive rate single transducer reproducing apparatus for storing the reproduced data in a multicell storage at a rate responsive to the manual rate of scan during one half of the operating cycle and translating the data from the storage to utilization circuitry at a different, substantially constant rate during the remaining half of the operating cycle.

Advantage is taken of the fact that the amplitude of the signal generated by an electromagnetic transducer traversing a magnetic record medium is proportional to the velocity at the lower velocities for which the invention is intended. A voltage controlled oscillator, or similar potential-responsive generating circuit, is used for generating a clocking wave responsive to the output of the transducer for entering the data, simultaneously produced by the transducer, into a multiple cell storage. For translating the stored data to utilization circuitry, a standard clock wave is used or a substantially fixed rate generator is used as will be further described hereinafter.

PRIOR ART

Electronic circuitry having features in common with the circuitry according to the invention is found in the following U.S. patents:
U.S. Pat. No. 3,597,751, 8/1971, Heldecker, et al.
U.S. Pat. No. 3,902,129, 8/1975, Boothroyd
U.S. Pat. No. 3,947,662, 3/1976, Vinal
U.S. Pat. No. 4,096,378, 6/1978, Vinal
U.S. Pat. No. 4,184,179, 1/1980, Deming The patent to Heldecker and Tertrich is of general background interest. It deals with problems of signal shift and the like with speed of medium movement, but it is directed to the relatively high speed range and therefore differs in theory as well as structure from the apparatus according to the invention.

The patent to Boothroyd is directed to varying velocity scanning of the medium with apparatus directly reading out the demodulated data. The single rate apparatus thus differs from the apparatus according to the invention in both the functioning and the structure therefor.

Similarly, the teaching and the structure found in the patents to Vinal differ from those according to the invention.

Deming, in his patent disclosure, is concerned with the lower speed range, but uses dual transducer single rate scanning apparatus which differs from that according to the invention.

Thus, the prior art does not anticipate the use of a single transducer for reproducing and storing recorded data at an adaptive rate during half an operating cycle and translating that data from storage at a higher, predetermined and substantially constant rate during the remaining half of the operating cycle.

DRAWING

In order that the practical aspects of the invention obtain in practice, the best mode embodiment thereof, given by way of example only, is described in detail hereinafter, with reference to the accompanying drawing, forming a part of the specification, and in which.

DESCRIPTION

Figure 1:
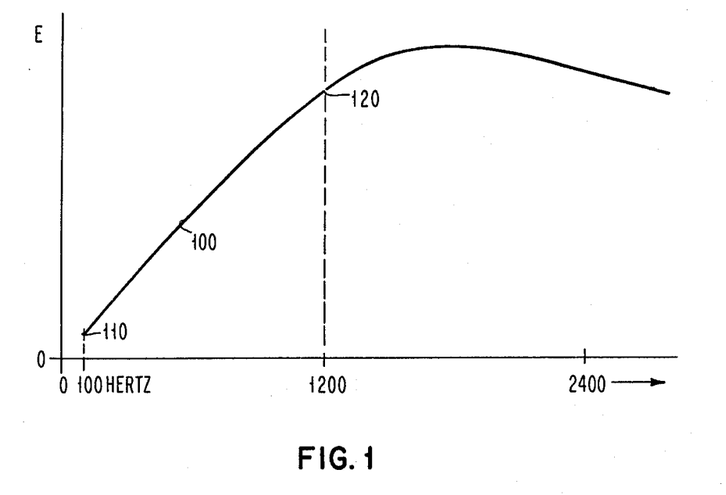
FIG. 1 is a graphical representation of the potential output of a typical electromagnetic transducer against frequency useful in an understanding of the invention.
Figure 2:
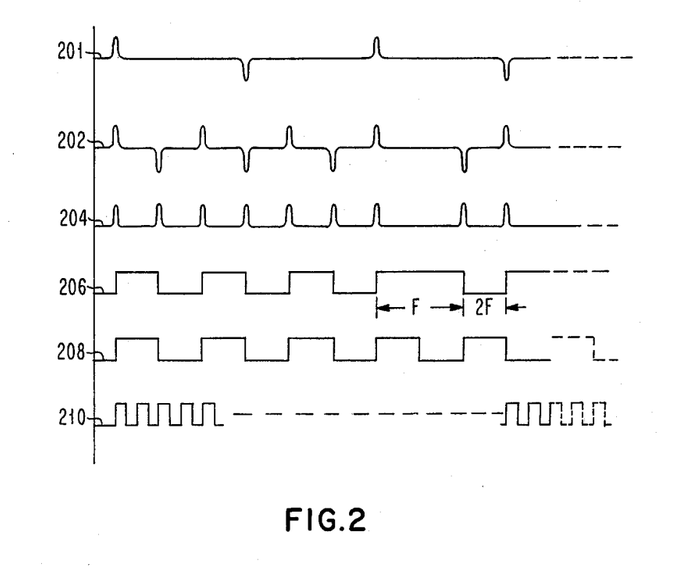
FIG. 2 is a graphical representation of waveforms useful in an understanding of the invention.

FIG. 1 depicts a response curve 100 representing the variation in potential with frequency of a typical transducer used in translating data digitally recorded on a magnetic stripe or like magnetic record at 29.5 bits per cm. (75 bits per inch) in pulse rate modulated binary recording manner, also well-known as F2F recording. The apparatus according to the invention is centered about utilizing the response between the points 110 and 120, which portion of the curve has a steep and substantially linear slope. The speed at which a magnetic stripe card or the like is passed through a reproducing transducer varies from 10.2 cm. per second (4 inches per second) to 30.5 cm. per second (12 inches per second). This range corresponds to 150 to 1200 hertz for the average F2F coded digital cording. Curves 201 and 202 shown in FIG. 2 are grahically idealized representations of such signal wave forms emanating from the conventional magnetic transducer, or optical sensor, under these conditions as used in a card accessing personnel accounting or like system for which the invention is intended.

It should be noted at this point that while optical transducer systems do not exhibit the amplitude variation shown in FIG. 1, therefore differ in pertinent manner, the apparatus according to the invention is compatible with the two types of transducers so that in a single installation, either type of transducer can be used, thus obviating the necessity for two different systems in a given installation.

Figure 3:
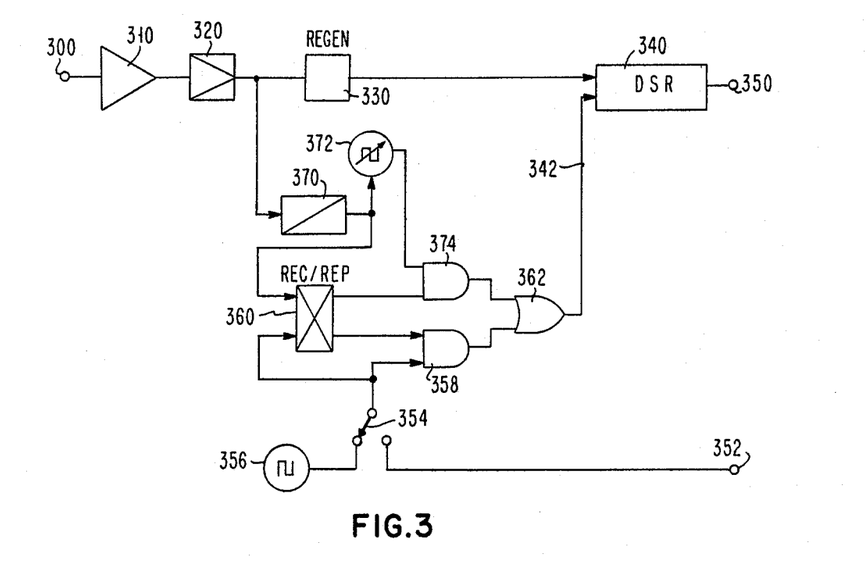
FIG. 3 is a functional diagram of a basic embodiment of an adaptive rate card sensor according to the invention.

FIG. 3 is a functional diagram of a basic circuit arrangement according to the invention. A transducer in an arrangement for scanning recorded data, for example, F2F digital magnetic stripe card for use with an electromagnetic transducer, is connected to an input terminal 300 leading to an impedance matching and signal amplifying and/or translating circuit 310. The relatively higher output signal from the circuit 310 is applied to a converting circuit 320 for producing a unilaterally going pulse signal, as shown at Curve 204 for example, which is applied to a regenerator circuit 330. The output of the regenerator circuit 330 is a conventional binary waveform, for example, an F2F signal, as shown by Curve 206, for application to a data storage register 340. The data stored during one-half of the operating cycle is sent on to an output terminal 350 which is connected in conventional manner to a conventional data processing system. The data storage register 340 is shown here much in the manner of a digital shift register, which is suggested as but one of the basic conventional types of register suitable for use with the invention. A shift pulse lead 342 is arranged according to the invention, to supply shift pulses at one or more rates suitable for feeding the stored data to the computer over the terminal 350 and at an adaptive rate for storing the data as will be described hereinafter. For translating the data to the data processing unit, a suitable shift rate pulse train is obtained from the data processing unit, if desired, and applied to input terminals 352. This shift pulse train is applied by way of a switch 354 to an AND gating circuit 358 which is conditioned by an output from a flip-flop circuit 360. The latter is reset each time a data extracting or shift pulse is applied for conditioning the gating circuit 358. The output of the AND gating circuit 358 is passed through an OR gating circuit 362 to the data shift register 340. By means of the switch 354, a local shift pulse generator 356 is alternatively used. It is often very much less expensive and frequently much more convenient to use a local oscillator 356 than to obtain a shift pulse train from the central processing unit, especially if the latter is located at some great distance from the card data reproducing apparatus.

The data output from the regenerator circuit 330 during the sensing and storing half of the operating cycle is at a varying rate and the shift pulse line 342 must have a train of pulses substantially equal to this rate. The output of the unilateral pulse generator circuit 320, which frequently is a full wave rectifier circuit, is applied to a filter circuit 370 for producing an output direct potential E proportional to the rate of the data. This direct potential E is applied to a potential responsive generator circuit 372 (also well-known as a "voltage controlled oscillator" (VCO)) for producing an output pulse train substantially equal to the data rate for application to an AND gating circuit 374 which is armed by the output of the flip-flop circuit 350 which is maintained in the proper output level by applying the direct potential output of the filter circuit 370 to the set terminal of the flip-flop circuit 360. Again, the output of the AND gating circuit 374 is routed through OR gating circuit 362 over the shift pulse line 342 to the data shift register 340. Thus, during the storing half of the operating cycle, the rate of shift pulses on the shift pulse line 342 is substantially equal to the data rate at the output of the regenerator circuit 330, at least over the range of 100 hertz to 1200 hertz.

Figure 4:
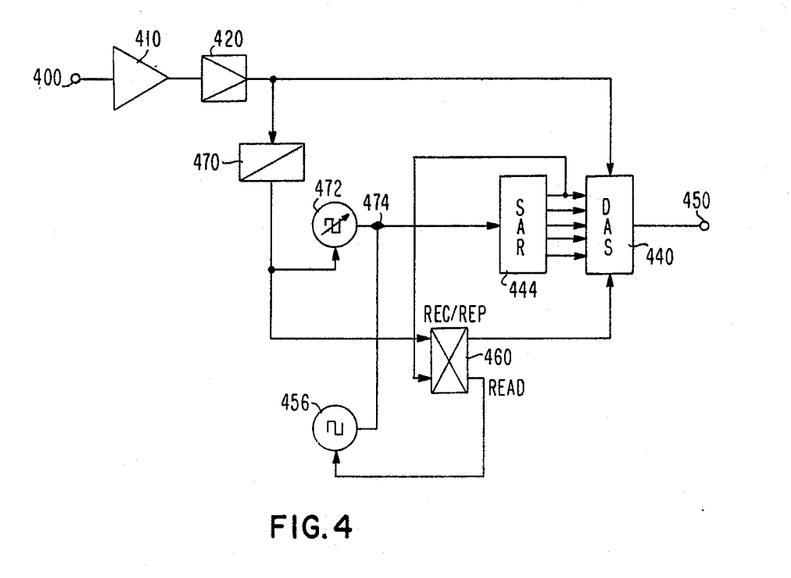
FIG. 4 is a functional diagram of an intermediate embodiment of an adaptive rate card sensor according to the invention.

FIG. 4 is a functional diagram of a different and an immediate embodiment of a circuit arrangement according to the invention as simplified for clarity of function. The output of the electromagnetic transducer is applied to input terminals 400 for application to an impedance matching and amplifying circuit 410, the output of which is applied to circuitry 420 for producing a unilateral pulse signal which is translated to the input circuit of a Direct Access Storage (DAS) 440 circuit. The output of the latter storage circuit is arranged for translation to a Central Processing Unit (CPU) connected to output terminals 450. The DAS 440 is addressed by a Storage Address Register (SAR) 444 for both storage and translation to the Data Processing Unit (DPU) at an output terminal 450. The output of the unilateral circuit 420 (as depicted in Curve 204) is brought to a filter circuit 470 and thence to the set terminal of a flip-flop circuit 460 having a "record" level output terminal connected to the DAS 440. The output of the filter circuit 470 presents a direct voltage proportional to the amplitude and frequency of the data signal to a VCO 472, the output of which is passed through a "dot OR" gating circuit 474 to the SAR 444. The flip-flop circuit 460 is reset by a connection from the output of the SAR 444 and the reset terminal of the flip-flop circuit 460. The "read" output terminal of the flip-flop circuit 460 is connected to another VCO 456 which is passed through the dot OR gating circuit 474 to the SAR 444. The VCO 456 is adjusted to the "read" logical level at the output of the flip-flop circuit 460 to provide pulse train suitable for transferring the data out of the DAS 440 by way of the output the terminal 450.

As the data on the card is reproduced, the input potential to the VCO 472 varies in accordance with the velocity and with the frequency, with the voltage being greater in amplitude as the card velocity is greater. This voltage controls the frequency of the VCO 472 in order to control the speed at which the SAR 444 is incremented. The output bus of the SAR 444 is connected to the address input of the DAS 440 and the storage cells in the DAS will be addressed as the SAR is incremented. In unison with this, the data (binary 1 and binary 0 in F2F form, for example) will be present on the input to the DAS 440 and this data will be stored in the first half of the operating cycle. Due to the relationshp of the potential at the output of the filter 470 and its control over the VCO 472 and the velocity of the card with respect to the transducer, each data bit will occupy substantially the same number of cells in the DAS 440 regardless of the velocity of the card. For example, the circuit is arranged to store each bit in 10 cells. Then, if at least 9, say, 10, or 11 cells are used for a given bit, the overall circuiting will interpret the entire bit or a bit of the same value as is common in systems of the type for which the invention is intended. The leading edge of the data word is arranged to set a control element flip-flop 460 which places the DAS 444 in a sensing and storing mode and allow storage of data.

When the highest order bit in the SAR 444 is reached, the control flip-flop circuit 460 is reset, the DAS 440 is placed in a readout mode for the second half of the operating cycle and the oscillator 456 is gated on to step the SAR 444 through the full range again but at a fixed rate adjusted to achieve compatibility with the CPU (not shown) and data is translated from the DAS 440 through the terminal 450 to the CPU. When the high order bit in the SAR 444 is again reached, the second half of the operating cycle is complete.

Figure 5:
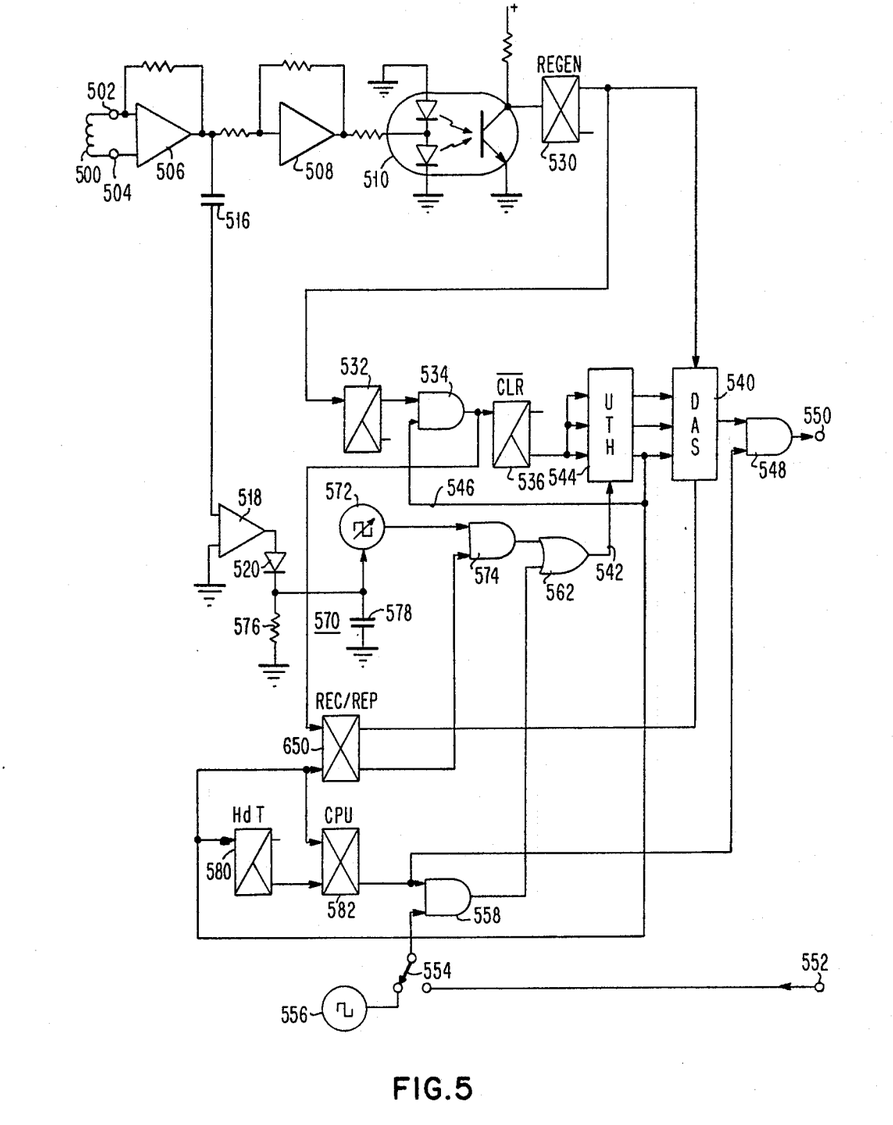
FIG. 5 is a functional diagram of a higher level embodiment of an adaptive rate card sensor according to the invention.

More sophisticated circuitry is shown in functional logic form in FIG. 5. A magnetically encoded card is arranged to pass the transducer 500 which is connected at terminals 502, 504 to the input circuit of an amplifier 506 to provide the output shown in Curve 202. This signal is applied by way of a capacitor 516 to an amplifier circuit 518. The output of amplifier circuit 518 is applied to a rectifier 520 and intercoupled filter 570 comprising a resistor 576 and a capacitor 578 from which a potential level that is proportional to the velocity of the card is applied to the input to the central circuit of a VCO 572. This voltage controls the VCO, which in turn provides a stepping signal. This VCO 572 is arranged to operate at a frequency that is directly related to card velocity.

The output of the input amplifier circuit 506 is also applied to an amplifier circuit 508 where it is further amplified and applied to a dual optocoupler 510. This coupler serves as a full wave rectifier to furnish negative going clock pulses to a flip-flop regenerator circuit 530. This arrangement converts the analog signal as in Curve 202 to a digital signal that coincides with the flux changes encoded on the magnetic medium. The flip-flop circuit 530 will complement with each flux change resulting in a signal with fast rise and fall times, as shown in Curve 206.

The card is frequently encoded with ten or more plus digits (clocks) or transitions at the initial end of the record. The first of these transitions will cause the flip-flop circuit 530 to complement and a monostable flip-flop circuit 532 to be triggered. The output of the monostable 532 will AND with SAR 544 Hundred "D" bit over line 546, and since SAR $H_d$ is a unit, this will trigger the monostable flip-flop 536. This will make CLEAR MAR false for a short time and reset the register 544 to SAR=000. The AND gate 534 will also condition the input of the REC/REP latch 560 on its falling edge and the latch will set at this time, placing the DAS 540 in a translate mode.

Figure 6:
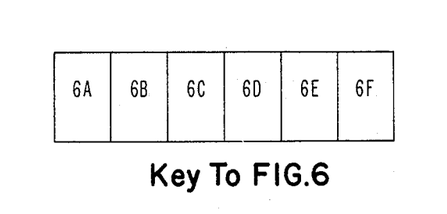
FIG. 6—sections A, B, C, D, E and F being taken together—is a functional diagram of a prototype adaptive rate card sensor and data storing circuit arrangement according to the invention.
Figure 6A:
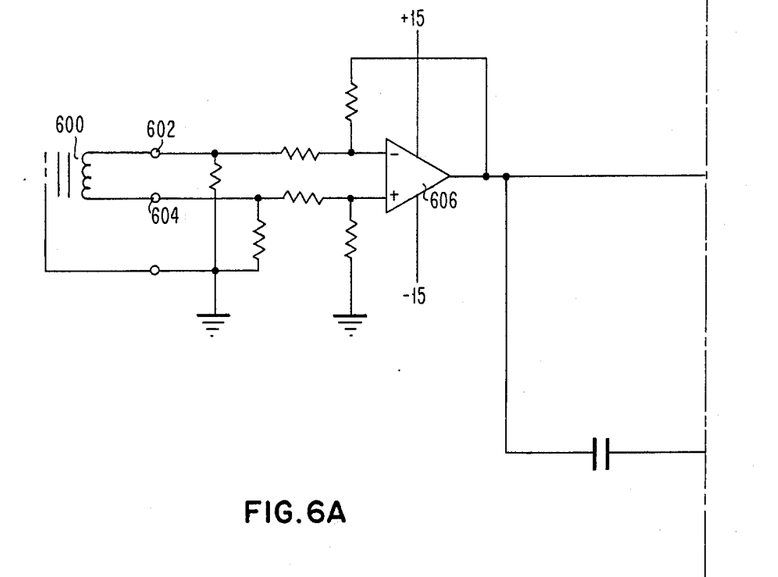
Figure 6B:
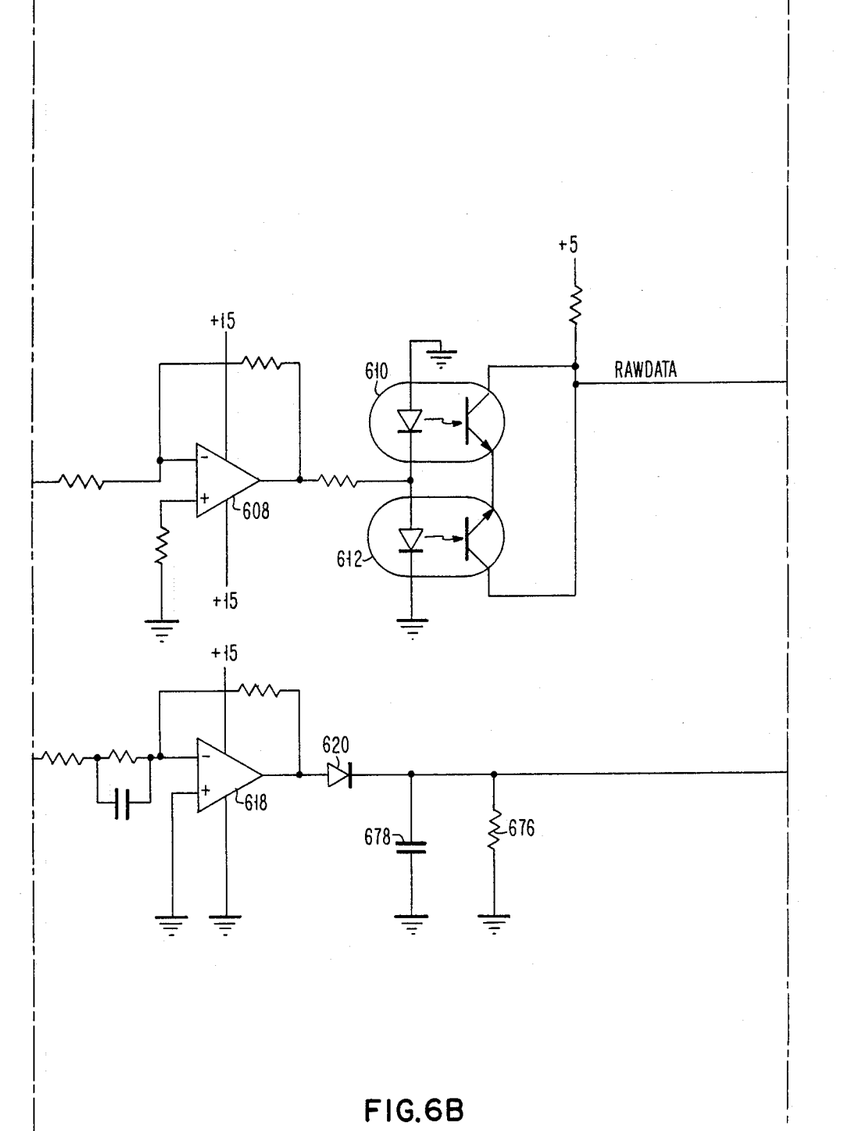
Figure 6C:
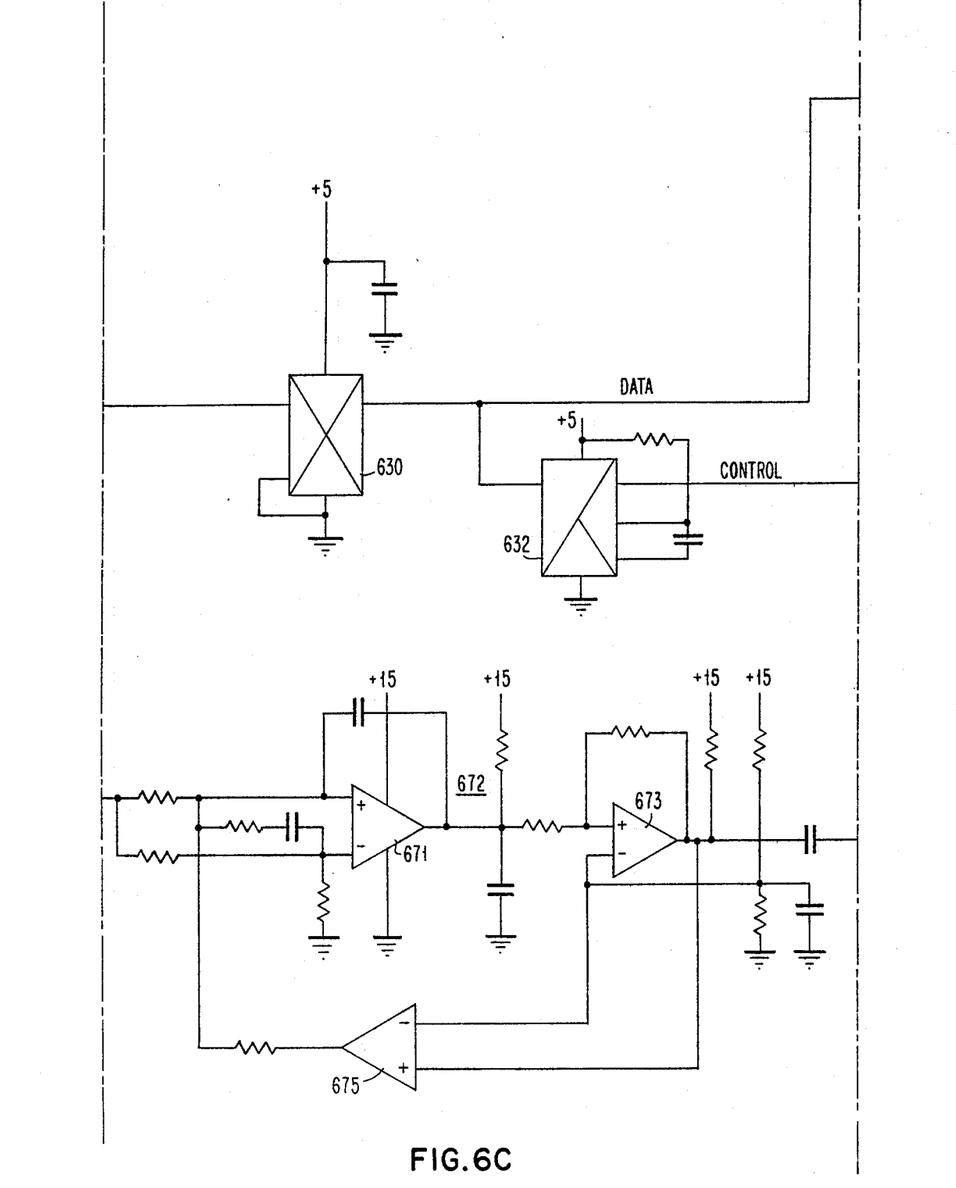

A functional diagram of a prototype adaptive rate card data sensor and storing circuit arrangement is shown in the six sections of FIG. 6. In FIG. 6A, an electromagnetic transducer 600 is connected to adapter input terminals 602 and 604, leading to an input amplifier circuit 606 which is an operational amplifier connected to a differential mode. The resistors connected between the terminals 602, 604 and the input terminals of the amplifier circuit 606, form an impedance matching network. This network is arranged in the customary manner for providing an impedance match between the transducer 600 and the preamplifier circuit 606. If desired, an optical transducer is connected to the terminals 602, 604, and the impedance matching network is arranged for the particular circuit impedance matching function as required. The output of the preamplifier circuit 606 (Curve 201 or 202, for example) is applied to a second operational amplifier circuit 608 (FIG. 6B) for bringing the signal up to a level compatible with the level required by a pair of optocouplers 610 and 612. These optocouplers are connected in a full wave demodulator circuit and the output is applied to a binary flip-flop data wave regenerator circuit 630 as shown (FIG. 6C). The output of this flip-flop circuit (Curve 206, for example) is a reconstructed data wave as sensed by the electromagnetic transducer 600 that changes state or complements with each flux change in the record media.

The output from the preamplifier circuit 606 (FIG. 6A) is also applied to another operational amplifier circuit 618 (FIG. 6B), the output of which (Curve 204, for example) is rectified by a diode 620 and smoothed by filter network comprising a resistor 676 and a capacitor 678. The rectifier output is applied to a voltage controlled oscillator 672 (FIG. 6C) formed by three operational amplifier circuits, 671, 673 and 675. This circuit is arranged to produce a pulse wave train having a pulse recurrence frequency directly related to the amplitude of the rectified signal at the output of the rectifier 620 (FIG. 6B) and therefore to the velocity of the card passing the transducer 600.

Figure 6D:
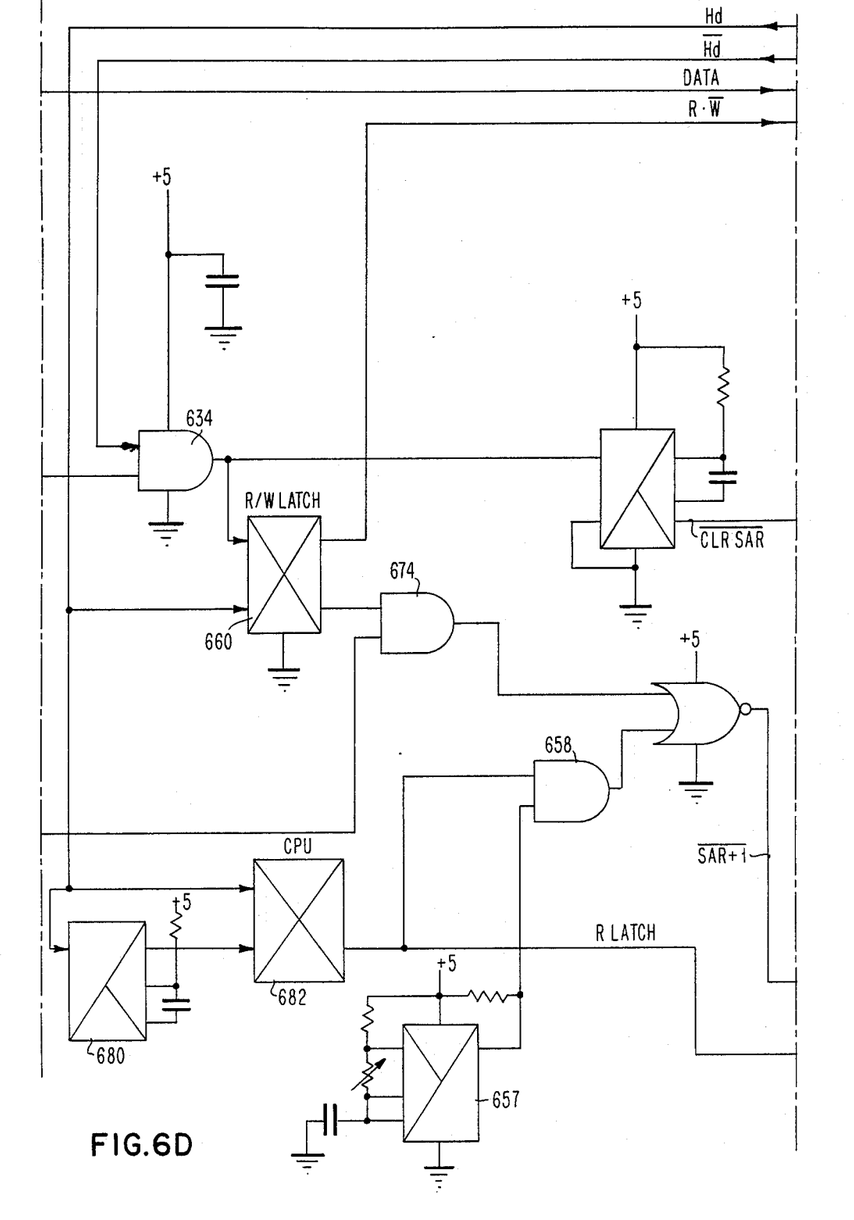

The output of the flip-flop circuit 630 (FIG. 6C) is applied to a control monostable flip-flop circuit 632. This monostable flip-flop circuit is triggered on the falling transition of the output wave of the bistable regenerator flip-flop circuit 630 for providing a control signal which is applied to an AND gate 634 (FIG. 6D). An enabling signal from the SAR 654 representing any address except that of the highest order is applied to the AND gating circuit 634. The output of this gating circuit 634 is applied to a bistable STORE/READOUT latch 660 to set it in a storing mode.

Figure 6E:
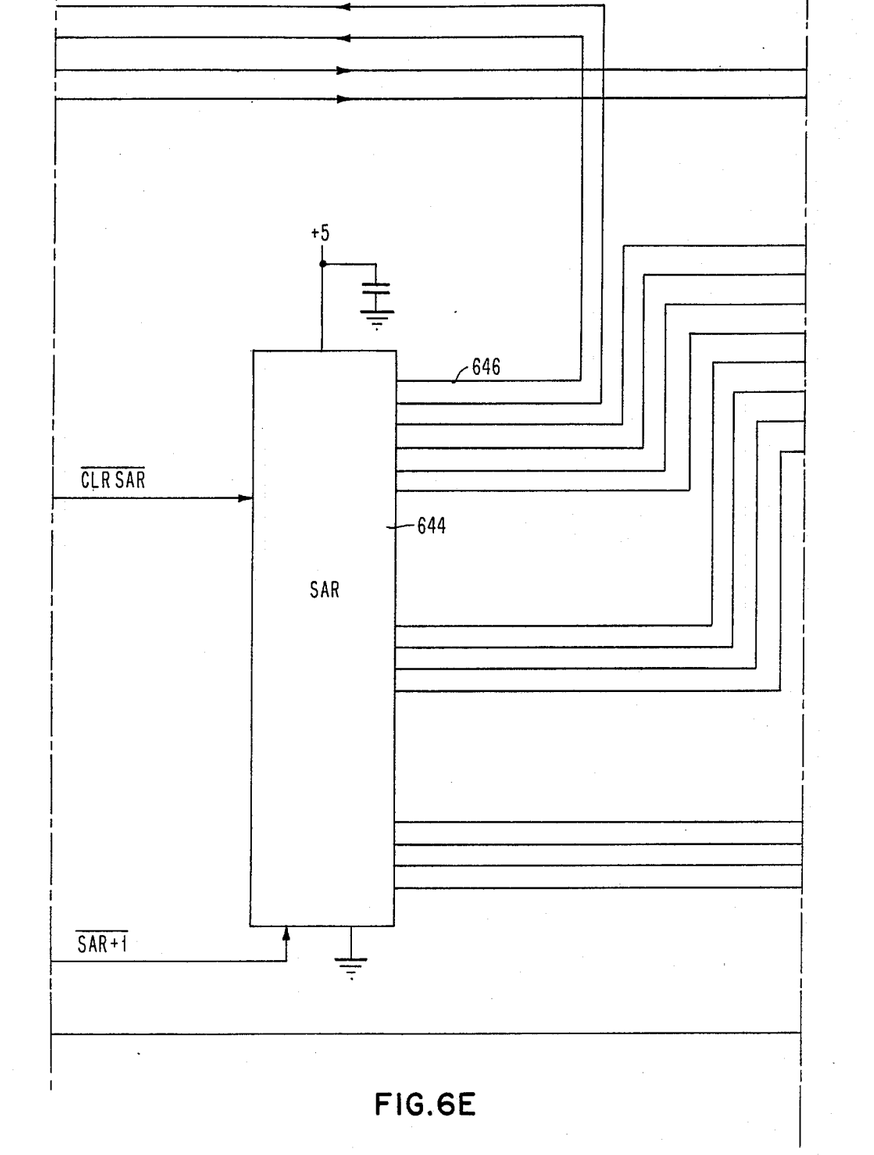
Figure 6F:
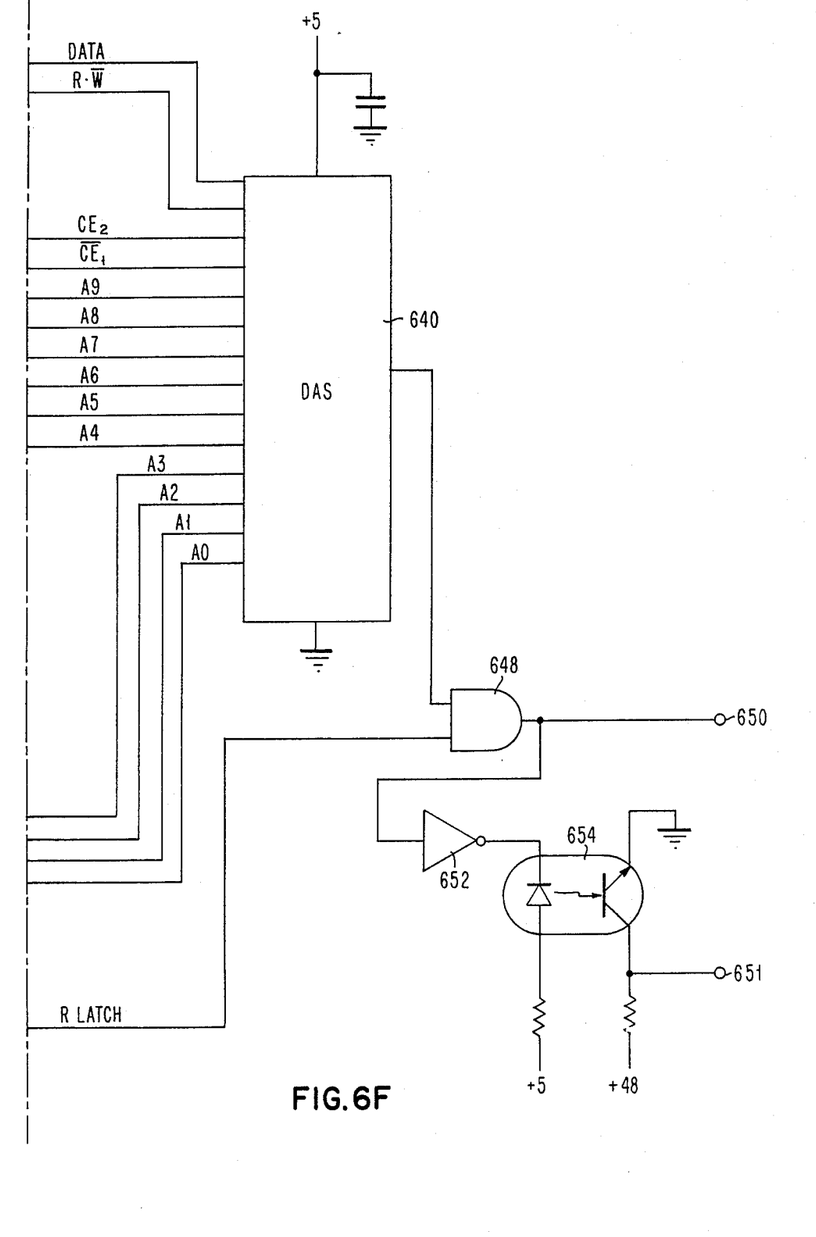

The same signal is also applied to a monostable flip-flop circuit 636, which on being triggered clears the SAR 644 (FIG. 6E) and sets it to 000. The P output of the latch 660 also is applied to an AND gating circuit 674 where the output of the VCO circuit 672 (FIG. 6C) in the form of adjustable rate pulse train is propogated through an OR gating circuit 662 (FIG. 6D) thereby to increment the SAR 644 (FIG. 6E).

As the SAR 644 is incremented, the storage cells in the DAS 640 are also incremented and the data from the flip-flop regenerator circuit 630 stored in ascending order. This action continues until the high order bit on line 646 of the SAR 644 is reached. At this time, the VCO 672 ceases producing the variable rate pulse train (for example, Curve 208) and the AND gating circuit 674 is brought down, the STORE/READOUT latch 660 is then reset into a readout mode, the CPU latch sets flip-flop circuit 682, and the clock pulse train generated in astable flip-flop circuit 657 is applied to an AND gating circuit 658 and the SAR 644 is again incremented. The DAS 640 which is now in a readout mode is incremented in unison with the SAR 644 and data from the DAS 640 is ANDed with the control from the CPU latch 682 by way of AND gating circuit 648. The output is available in a TTL logic level at an output gating circuit 648. A higher logic level output is available by way of an inverter circuit 652 and an optocoupler device 644. The circuitry is readily designed for such logical level output as is required. This action continues until the astable flip-flop circuit 657 times out, which timing out is adjusted to coincide with the desired transmission speed and media.

While the invention has been described in terms of express embodiments, and alternatives have been suggested, it should be recognized that those skilled in the art will suggest other changes without departing from the spirit and scope of the invention as defined in the appended claims concluding the specifications.

This invention claimed is:

1. An adaptive rate sensor based magnetic stripe card data storing and translating terminal, comprising
    an electromagnetic transducer and magnetic card transport arranged for sensing data recorded on said card, with the amplitude of the data signals from the transducer varying the proportion to the relative velocity of said transducer and said transport,
    circuitry for generating, in response to said data signals, a timing pulse train of repetition rate proportional to said amplitude of said signal,
    a source of pulses of substantially fixed repetition rate,
    storing circuitry having a data input terminal coupled to said transducer and a control signal terminal for stepping the storing circuitry bit-by-bit, and
    circuitry for selectively connecting said generating circuitry to said control signal terminal for storing said data signals as sensed and connecting said source of substantially fixed rate pulses to said control signal terminal for translating the stored data from said storing circuitry.

2. An adaptive rate sensor based magnetic stripe card data storing and translating terminal,
    as defined in claim 1 and wherein
    said generating circuitry comprises a voltage controlled oscillator.

3. An adaptive rate sensor based magnetic stripe card data storing and translating terminal,
    as defined in claim 1 and wherein
    said storing circuitry comprises a shift register.

4. An adaptive rate sensor based magnetic stripe card data storing and translating terminal,
    as defined in claim 1 and wherein
    said connecting circuitry comprises
    a bistable flip-flop circuit having a set terminal coupled to said generating circuitry and a reset terminal coupled to said source of pulses.

5. Adaptive rate card data reproducing and storing apparatus, comprising
    a data reproducing element arranged for generating a bidirectional electric wave representative of the data on the card in response to relative motion between said card and said element and wherein said relative motion is varying and the amplitude of the generated wave is varying in proportion to the velocity,
    a demodulator element coupled to said data reproducing element for producing a unidirectional electric wave corresponding to said bidirectional electric wave,
    a regenerating element coupled to said demodulator element for producing a substantially square wave corresponding to said electric wave and representative of said data on the card,
    a binary data storage register coupled to said regenerating element for storing the data on said card, having an output circuit for delivering said data and having a data translating control terminal,
    a filter circuit connected to said rectifier element for producing a substantially constant potential proportional to the amplitude of said unidirectional electric wave,
    an oscillator circuit having a control potential terminal connected to said filter circuit and having an output terminal at which is presented a pulse wave of repetition rate proportional to said potential at said filter circuit,
    a source of oscillations of substantially constant repetitive rate, and
    a gating circuit having one input terminal connected to said oscillator circuit, another input terminal connected to said source of oscillations, an output terminal connected to said data translating control terminal of said data storage register, and at least one terminal coupled to said demodulator element for selectively gating said oscillator to said data storage register.

6. An adaptive rate card data reproducing and storing apparatus,
    as defined in claim 5 and wherein
    said storage register comprises a direct access storage and
    a storage address register coupled to said direct access storage.

7. Adaptive rate card data reproducing, storing and readout apparatus, comprising
    a probe element arranged for generating a bidirectional electric wave representative of the data on the card in response to relative motion between said card and said probe and wherein said relative motion is varying and the amplitude of the generated wave is varying in proportion to the velocity,
    a circuit element coupled to said probe element for producing a unidirectional electric wave corresponding to said bidirectional electric wave,
    a binary data storage register coupled to said probe element for storing the data on said card, having an output circuit for delivering said data in binary form and having a data translating control terminal,
    a filter circuit connected to said circuit element for producing a substantially constant potential proportional to the amplitude of said unidirectional electric wave,
    an oscillator circuit having a control potential terminal connected to said filter circuit and having an output terminal at which is presented a pulse wave of repetition rate proportional to said potential at said filter circuit, a source of oscillations of substantially constant repetition rate, and a gating circuit having one input terminal connected to said oscillator circuit, another input terminal connected to said source of oscillations, an output terminal connected to said data translating control terminal of said data storage register, and at least one terminal coupled to said circuit element for selectively gating said oscillator circuit and said source of oscillations to said data storage register.

8. Adaptive rate magnetic data record reproducing and storing apparatus, comprising a probe element arranged for generating a bidirectional electric wave representative of the data on the record in response to relative motion between said record and said probe and wherein said relative motion is varying and the amplitude of the generated wave is varying in proportion to the velocity, a rectifier element coupled to said probe element for producing a unidirectional electric wave corresponding to said bidirectional electric wave, a regenerating element coupled to said rectifier element for producing a substantially square wave corresponding to said electric waves and representative of said data on the card, a binary data storage register coupled to said regenerating element for storing the data on said card, having an output circuit for delivering said data in binary form and having a data translating control terminal, a filter circuit connected to said rectifier element for producing a substantially constant potential proportional to the amplitude of said unidirectional electric wave, an oscillator circuit having a control potential terminal connected to said filter circuit and having an output terminal at which is presented a pulse wave of repetition rate proportional to said potential at said filter circuit, a source of oscillations of substantially constant repetition rate, and a gate circuit having one input terminal connected to said oscillator circuit, another input terminal connected to said source of oscillations, an output terminal connected to said data translating control terminal of said data storage register, and at least one terminal coupled to said rectifier element for selectively gating said oscillator circuit and said source of oscillations to said data storage register.

* * * * *